US005080573A

United States Patent [19]

[11] Patent Number: 5,080,573

Schaidl et al.

[45] Date of Patent: Jan. 14, 1992

[54] ISOSTATIC PRESS FOR MAKING COMPACTS OF POWDERED CERAMIC MATERIAL

[75] Inventors: Hubert Schaidl, Bichl; Bernd Wunderlich, Kochel, both of Fed. Rep. of Germany

[73] Assignee: Dorst-Maschinen- und Anlagenbau Otto Dorst und Dipl.-Ing. Walter Schlegel GmbH & Co, Fed. Rep. of Germany

[21] Appl. No.: 516,560

[22] Filed: Apr. 30, 1990

[30] Foreign Application Priority Data

May 10, 1989 [DE] Fed. Rep. of Germany ....... 3915296

[51] Int. Cl.[5] ......................... B28B 3/00; B29C 43/12

[52] U.S. Cl. .................................... 425/346; 425/356; 425/405.200; 425/412; 425/414

[58] Field of Search ..................... 425/346, 389, 405.1, 425/405.2, 412, 414, 453, 454, DIG. 44, 183, 356, 436 R

[56] References Cited

U.S. PATENT DOCUMENTS

| | | | |
|---|---|---|---|
| 4,063,941 | 12/1977 | Papen | 425/405.2 |
| 4,084,932 | 4/1978 | Morris et al. | 425/405.2 |
| 4,560,336 | 12/1985 | Bühler et al. | 425/405.2 |

FOREIGN PATENT DOCUMENTS

| | | | |
|---|---|---|---|
| 1383395 | 2/1975 | United Kingdom | 425/405.2 |

*Primary Examiner*—Jay H. Woo
*Assistant Examiner*—James P. Mackey
*Attorney, Agent, or Firm*—Reese Taylor

[57] ABSTRACT

In an isostatic press for making compacts of powdered cermaic material, a tool part has, on a sliding head, twice as many mold needles as mold parts which, together with the mold needles, limit molds for making the compacts. The distance between the mold needles on the sliding head is half the distance between the mold parts. The sliding head is moved back and forth in phases in the longitudinal direction of the row of mold pots by the distance between the mold needles, so that, at the same time as the produced compacts are lifted out and deposited on conveyor belts, the other mold needles are moved into the mold pots.

12 Claims, 5 Drawing Sheets

ISOSTATIC PRESS FOR MAKING COMPACTS OF POWDERED CERAMIC MATERIAL

RELATED PATENT APPLICATIONS

This application claims priority under 35 U.S.C. 119 based on Federal Republic of Germany Application P 39 15 296.0 filed May 10, 1989.

BACKGROUND OF THE INVENTION

The present invention relates to an isostatic press for making compacts of powdered ceramic material. The invention deals in particular with the production of electrolyte sheaths which are used in batteries.

DESCRIPTION OF THE PRIOR ART

To produce such compacts of powdered ceramic material by isostatic compression, it is known to use pot-like mold parts containing rubber sheaths that, with mold needles moved into the mold pots, limit the molds or mold cavities for making the compacts. After these mold cavities have been filled with powdered material, the mold is closed and the isostatic pressing produced by pressurizing an oil cushion disposed behind the rubber sheath up to 2000 bar. After pressure reduction and a certain relief period, the sheaths are lifted out of the mold pots, which is done by raising the mold needles to while the sheaths adhere. Since such compacts are mass-produced articles, especially in the case of electrolyte sheaths, it is necessary to coordinate the pressing process in such a way that several sheaths can be produced in each phase. For this reason, one uses tools having a plurality of mold pots and mold needles. Presses are thus known wherein the mold pots are disposed in rows on the bed of the press, spaced evenly apart in each row. The mold needles are carried by a tool part coupled with the upper ram of the press. This makes it possible to produce a plurality of electrolyte sheaths in each phase. Since the compression process and the subsequent relief process require a predetermined time span, the mold needles are provided, in a further development of the press, on a movable sliding head so that, during the production of the sheaths in the mold pots, mold needles previously lifted out of the mold pots cooperate with gripping means which remove the sheaths from the mold needles and deposit them on a transport belt. After the end of the time period required for compression and subsequent relief, the mold needles are lifted out of the mold pots and shifted to the gripping means at the same time as the mold needles freed from the sheats are shifted into the mold pots, so that new electrolyte sheaths can be produced parallel to the depositing of sheaths from the mold needles on a transport belt.

SUMMARY OF THE INVENTION

The invention is based on the problem of developing a press of the described type in such a way that it can produce a large number of sheaths in each phase while having a simple construction and motion pattern as well as favorable load distribution. A favorable arrangement of the tool members and the gripping and transport means is to ensure good access to the tool itself.

According to the invention, the sliding head bears at least one, but preferably two, rows of mold needles, the mold needles being disposed in an exactly straight line and spaced evenly apart in each row. The number of mold needles provided is twice the number of the pot-like mold parts disposed on the bed of the press. The distance between adjacent mold needles, which is equal in all rows of mold needles, is half as large as the distance between adjacent mold parts, which is equal in all rows. This means that the pitch of the mold needles is half as long as the pitch of the mold parts on the bed. The distances between the mold needles and the mold parts are, of course, such that a row of mold parts is aligned with a row of mold needles. What is important is that the motion of the sliding head takes place in the axial direction of the rows of mold needles and mold parts and corresponds to the pitch of the mold needles, i.e., half the length of the space between the mold parts. After the compacts are produced in the mold pots and the compacts are lifted out by an upward motion of the mold needles, the sliding head moves in the axial direction of the rows by a length corresponding to the space between the mold needles and thus half the distance between the mold parts. This causes the mold needles with the sheaths adhering thereto to move over laterally disposed transport means where they are deposited. At the same time as this sliding head motion, the mold needles which were just freed from the sheaths are moved over the mold pots just released, so that compacts can be produced, parallel to the removal of the sheaths, utilizing the mold needles that have now been moved over the mold pots. Thereafter, the mold needles are lifted out of the mold pots and the sliding head is moved back in the opposite direction in the axial direction of the rows by the pitch of the mold needles, i.e., half the distance between the mold parts, and so on. The motion of the sliding head in the axial direction of the rows shifts the sliding head bearing the numerous mold needles back and forth out of the center of gravity of the press to only a small extent, so that there is only a small change in the center of gravity during operation of the press, which has a favorable effect on the exact alignment of the needles and also on the production of the compacts. At the same time, the sliding head motion is relatively short. The transport belts may extend perpendicular to the axial direction of the rows of mold pots and mold needles, thereby ensuring good access to the mold members. At the same time, the gripping means can be readily placed between the mold pots or beside the outer mold pots of the row without impairing the access to the mold members. The sliding head motion does not impair the feed of the powder either. All in all, this also permits the filling tubes coupled with the filling containers to be of simpler design.

It is expedient to transport the sheaths away using endless belts extending perpendicular to the axial direction of the rows. Due to the working motion of the sliding head, the transport belts are disposed in such a way that two adjacent belts limit between them the opposite mold pots of several rows, so that the compacts lifted out of these mold pots can be deposited first on the left belt and then on the right belt, depending on the sliding head. The transport belts are expediently equipped with pot-like holding members on which the sheaths are deposited. The sheaths are removed using simple gripping means disposed above the transport belts and having claws that grasp the sheaths, so that, when the mold needles are raised, the sheaths are automatically removed. The transport belts, i.e., the pot-like holding members and the claws of the gripping means, are positioned in such a way that, after the mold needles are lifted out of the mold pots and shifted by half the pitch of the mold parts, the needles are aligned exactly above the transport belts or with corresponding gripping means.

The sliding head motion is produced in simple fashion by a hydraulically or pneumatically operated piston guided in a cylinder. In a constructionally advantageous embodiment, the molds are closed and opened in the vertical direction and the tool part receiving the sliding head is coupled with the upper ram of the press, whereas the mold pots are disposed on the stationary bed of the press.

BRIEF DESCRIPTION OF EXEMPLARY EMBODIMENTS

Figure 2:
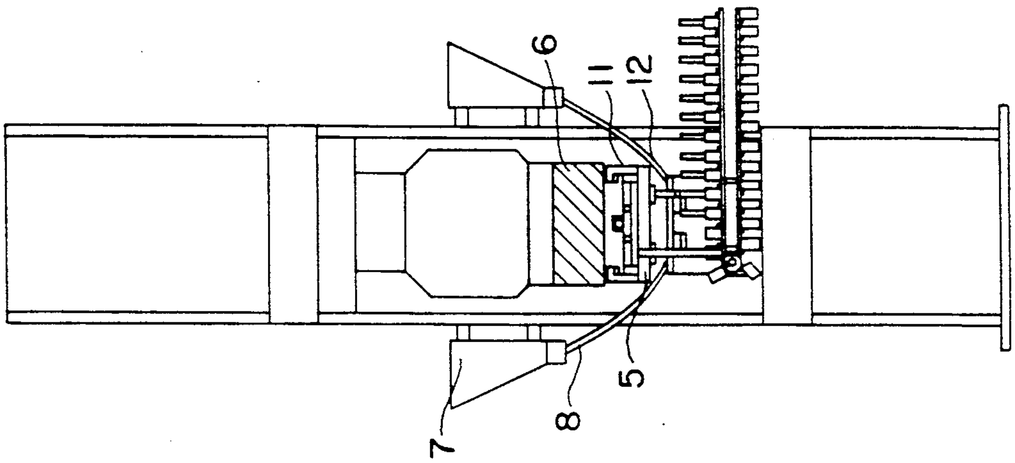
FIG. 2 schematically shows a side view of the press.
Figure 1:
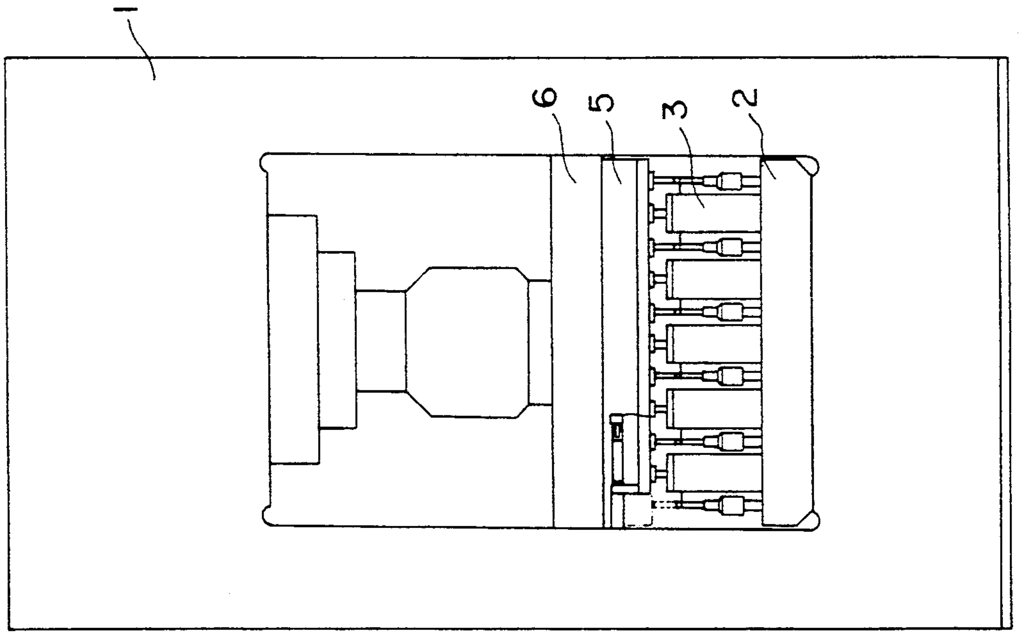
FIG. 1 schematically shows a front view of the press.

FIGS. 1 and 2 show schematically the overall construction of the press. The press includes a frame referred to as 1, a bed 2 stationary with frame 1 and bearing mold parts 3 which, together with needle-like mold members 4 better seen in FIG. 3, limit molds for making the compacts. Mold needles 4 are received on a sliding head 5 which, as a component of tool part 6, is coupled with the upper ram of the press that is adapted to be moved vertically up and down. The molds are filled via filling containers 7 disposed laterally on the press, the number of these containers corresponding to the number of molds. The powder is supplied directly from these filling containers 7 to the molds via feed pipes 8.

Figure 3:
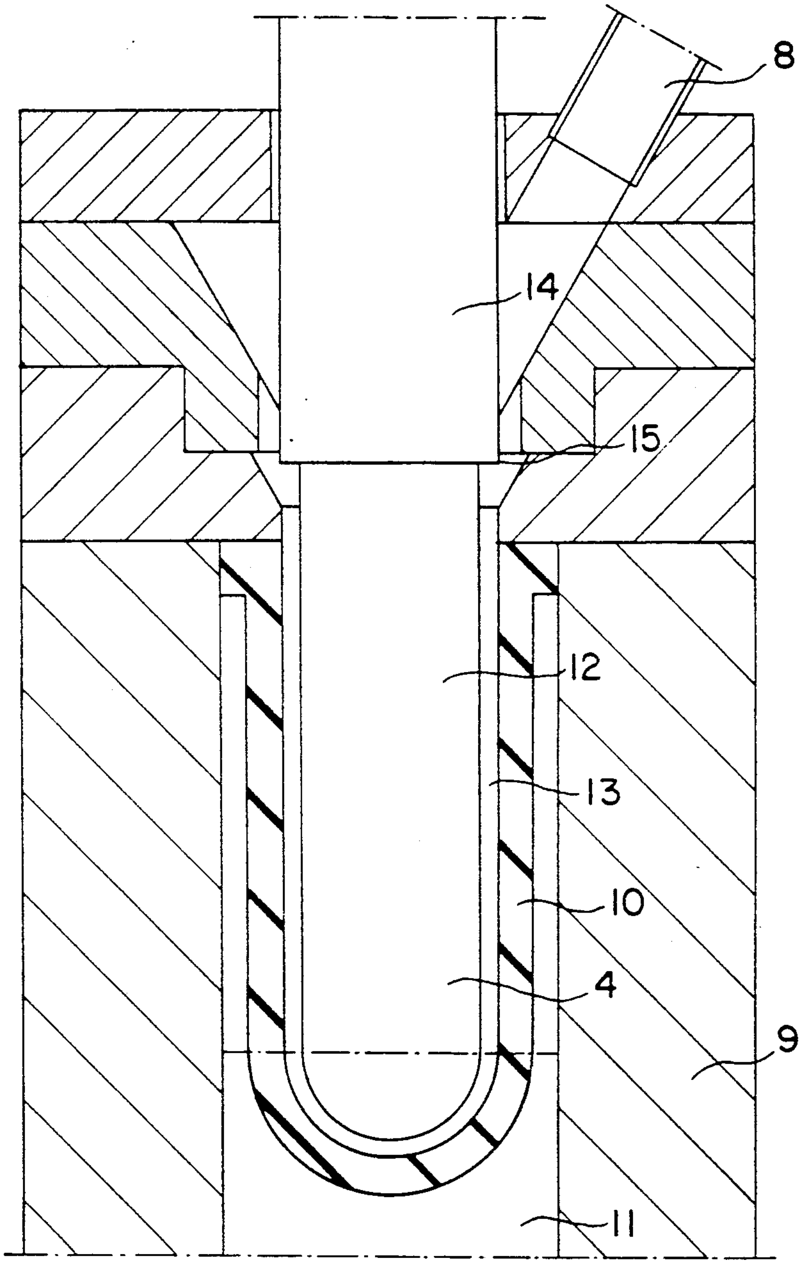
FIG. 3 schematically shows a cross-sectional view of a mold for producing a compact.

According to FIG. 3, the mold parts are each formed of a box-like mold pot 9 which is expediently made of steel and bears a rubber sheath 10 in the interior. Mold pot 9 limits below rubber sheath 10 a chamber 11 for receiving oil. Mold member 4, in the manner of a pin-like mold needle 12, can be introduced into rubber sheath 10 open at the top, said needle limiting with rubber sheath 10 a mold cavity 13, the mold for making the compact, which is filled with powder from above via feed pipe 8. After mold 13 has been filled, the mold cavity is closed at the top, for example, by moving down a sheath 14 that, with its shoulder 15, closes mold 13 from above. Application of pressure produces the isostatic compression of the powder contained in mold 13. After pressure reduction and a certain relief, mold needle 12 is lifted out of rubber sheath 10 so that the compact adhering thereto is lifted out of mold pot 9.

The embodiment of the press shown uses two straight rows 16 and 17 with five mold pots 9 each, i.e., altogether ten mold pots 9. The axial directions of rows 16 and 17 are parallel to each other, and mold pots 9 of rows 16 and 17 are not offset from each other, i.e., opposite mold pots 9 of rows 16 and 17 are located on a plane perpendicular to the axial direction of rows 16 and 17, i.e., exactly opposite each other.

Figure 4:
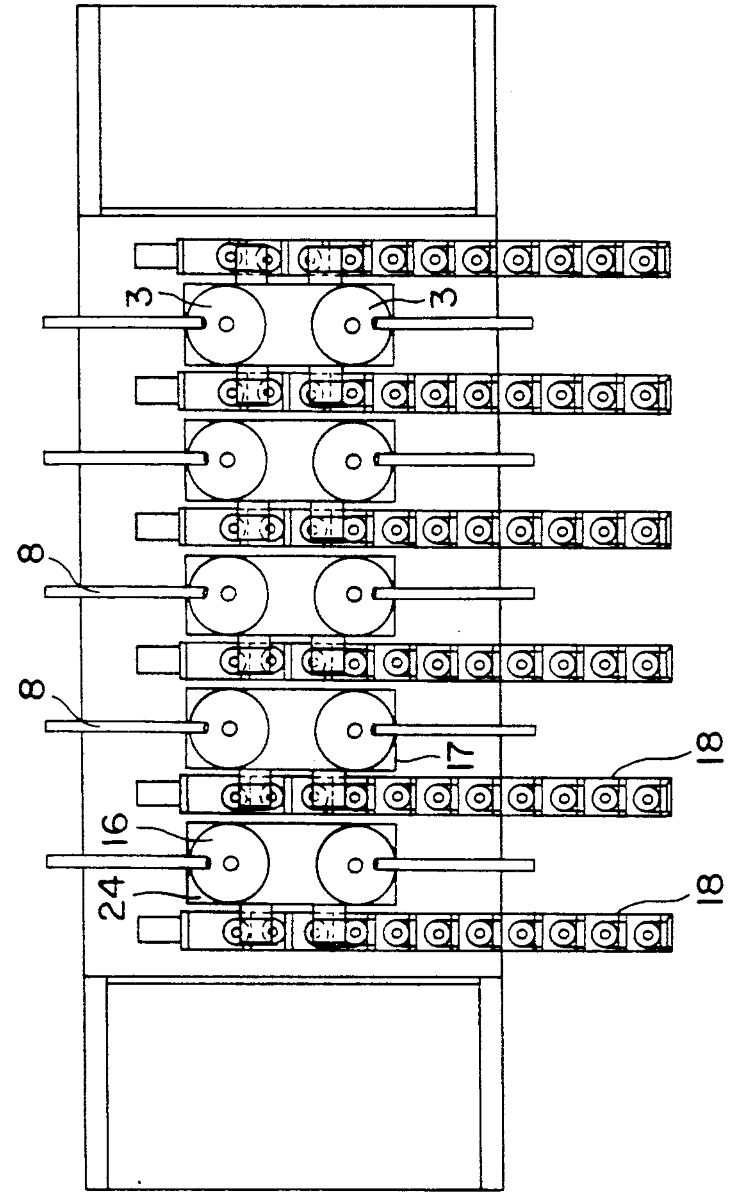
FIG. 4 schematically shows a top view of the bed of the press with mold parts disposed thereon.
Figure 5:
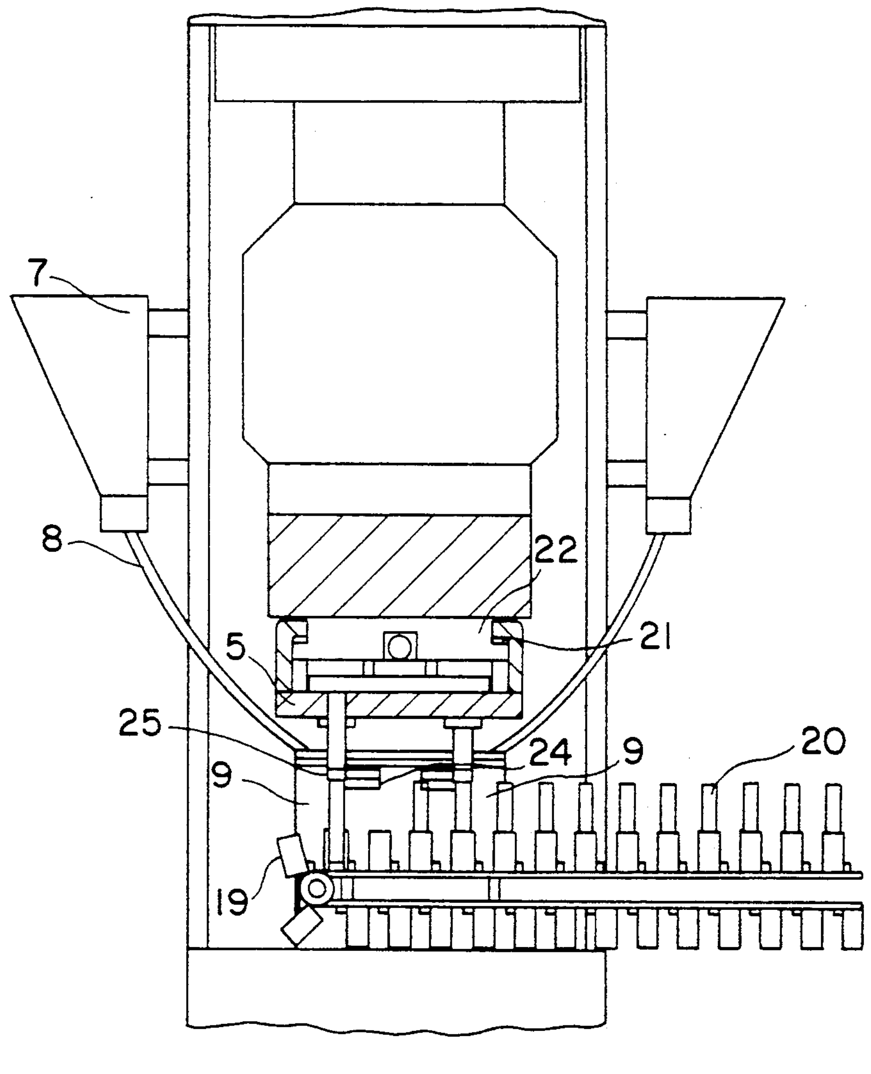
FIG. 5 schematically shows a side view of a part of the press as in FIG. 2, but enlarged.

Transport belts 18 extend perpendicular to the axial direction of rows 16 and 17 between the opposite pairs of mold pots 9. At both ends of rows 16 and 17, there are transport belts 18 on the outside beside outer mold pots 9. Each pair of mold pots 9 is therefore limited by two adjacent transport belts 18. Transport belts 18 are expediently formed by endless belts with an upper and a lower half, as indicated by FIG. 5. FIG. 5 also shows that pot-like holding members 19 are disposed on transport belts 18 for receiving compacts or sheaths 20 removed from mold needles 12. FIG. 4 shows quite clearly that there is sufficient room between transport belts 18 for feed pipes 8 through which powder is fed to the mold pots from individual filling containers 7 expediently by the use of gravity.

Figure 6:
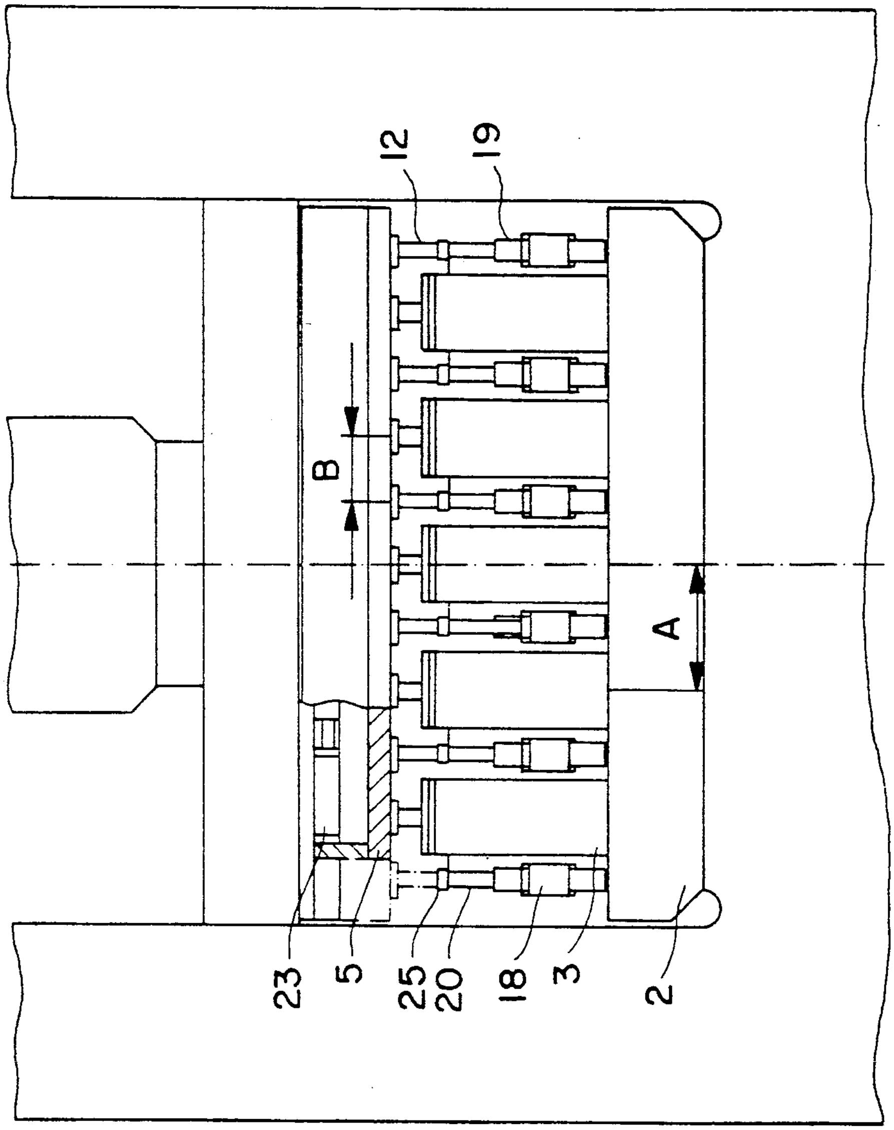
FIG. 6 schematically shows a front view of the press as in FIG. 1, but enlarged.

Mold needles 12 are all received on a sliding head 5 which is guided via guide means 21 on a holding plate 22 coupled with the upper ram. Sliding head 5 is moved pneumatically or hydraulically by a cylinder-piston unit referred to as 23 in FIG. 6. FIG. 6 also shows mold pots or parts 3 disposed in a row and the association of mold needles 12 carried on sliding head 5 to these mold parts 3. Sliding head 5 carries one row of mold needles 12 per row of mold parts 3, so that altogether twenty mold needles are received on sliding head 5 in the embodiment shown. Mold parts 3 of both rows are spaced apart on bed 2 of the press by the same distance A, and mold needles 12 are also spaced apart by the same distance B, whereby distance B is half as long as distance A. The distance between mold needles 12 is thus half the pitch of mold parts 3. Sliding head 5 has, of course, two rows of mold needles 12, each row of mold needles 12 having ten mold needles in straight alignment. Mold needles 12 of each row are located on a vertical plane above the associated mold pots or mold parts 3, as seen best in FIG. 5. This ensures that when the upper ram of the press is lowered, mold needles 12 received on sliding head 5 are moved exactly into the openings in mold pots 9.

Between opposite mold parts 3 and at both ends of rows 16 and 17, there are gripping means 24 which can be seen best in FIGS. 4 and 5. Gripping means 24 have claws 25 apparent in FIG. 6. Claws 25 are disposed above transport belts 18. Each mold pot has associated therewith two gripping means 24 and two transport belts 18, whereby transport belts 18 and gripping means 24 disposed between the opposite pairs of mold parts 3 are used commonly by the adjacent mold pots or in conjunction with these adjacent mold pots. Altogether, six transport belts 18 and twelve gripping means 24 are provided for ten mold pots 9 or mold parts 3, as shown in FIG. 4.

The mode of operation of the press is as follows. With the downward motion of the upper ram, the ten mold needles 12 aligned with the ten mold pots 9 are moved into mold pots 9, or rather into rubber sheaths 10 received therein, cf. FIG. 3. During the filling process, compression and the subsequent relief, the other ten mold needles 12 offset by half the pitch B in the axial direction of rows 16 and 17 are in alignment above transport belts 18, as seen best in FIG. 6. When sliding head 5 is moved upward to lift mold needles 12 out of mold pots 9 after compression and relief of the compact, mold needles 12 are simultaneously lifted off transport belts 18, whereby the sheaths or compacts 20 still adhering to mold needles 12 are removed during this upward motion. After mold needles 12 are lifted off, sheaths 20 received in holding members 19 are conveyed out of the press in accordance with the phase motion of transport belts 18. Thereafter, sliding head 5 is moved to the left or to the right in the axial direction of rows 16 and 17 depending on the phase as in FIG. 6, so that the compacts adhering to mold needles 12 and just produced in mold 13 are moved via conveyor belts 18. According to FIG. 6, the motion is to the left, as shown by the shading. This moves mold needles 12 previously aligned above the conveyor belts above mold pots 9, so that the downward motion of sliding head 5 moves the mold needles with the compacts adhering thereto onto conveyor belts 18, on the one hand, and the mold needles previously aligned with the conveyor belts into mold pots 9, on the other hand. After compression and thus production of the compacts, sliding head 5 is raised again and now moved to the right by half the pitch, i.e., by distance B in FIG. 6, so that a compact is produced at the same time a compact is deposited. One may, of course, depart from the embodiment shown and use more than two rows of mold pots and mold needles without altering the motion of sliding head 5 by half the pitch of mold pots 9 in the axial direction of rows 16 and 17.

What is claimed is:

1. An isostatic press for making compacts of powdered ceramic material, having a tool part bearing at least one row of mold needles which tool part, for closing and opening molds, is movable relative to an opposed part of the press on which mold parts are disposed in at least one straight row and spaced apart evenly in the at least one straight row, whereby the mold parts, together with the mold needles movable thereinto, form the molds for the compacts, the press further comprising: a sliding head (5) carried by the tool part (6), the mold needles being attached to said sliding head, each row of mold needles having, for each row of mold parts (3), twice as many mold needles (12) as mold parts being provided in the row of mold parts, the mold needles being aligned with the mold parts and spaced apart evenly in the row of mold needles by a distance corresponding to half the distance between the mold parts (3) in the row of mold parts, the sliding head (5) being movable back and forth by a distance equal to the distance (B) between the mold needles (12) in the longitudinal direction of the row of mold parts (16,17) and perpendicular to the closing and opening motion of the press so that, by phases, the mold needles (12) aligned with the mold parts (3) are moved into a position in the longitudinal direction of the row of mold parts (16,17) beside the mold parts (3), and the mold needles (12) previously positioned beside the mold parts (3) are moved above the mold parts (3).

2. The isostatic press of claim 1, wherein the press has more than one row (16,17) of mold parts (3) and mold needles (12) which are disposed parallel to each other and not offset from each other.

3. The isostatic press of claim 1 or 2, wherein transport belts (18) are provided which extend perpendicular to the longitudinal direction of the row of mold parts (16,17) between the mold parts (3) and at both ends of the row of mold parts beside the outer mold parts (3) of the row of mold parts, in such a way that a mold part (3) of a row of mold parts, or oppositely disposed mold parts of several rows of mold parts (16,17), are each located between two transport belts (18) extending in a direction perpendicular to the longitudinal direction of the row of mold parts.

4. The isostatic press of claim 3 wherein gripping means (24) are aligned with said transport belts (18) beside the mold parts (3) for removing the compacts (20) from the mold needles (12).

5. The isostatic press of claim 3 wherein holding members (19) for receiving the compacts (20) are provided on the transport belts (18), the distance between the holding member (19) and the adjacent mold part (3) being half the distance (B) between adjacent mold parts (3) in the row of mold parts.

6. The isostatic press of claim 3 wherein feed pipes (8) extending from filling containers (7) to the molds (13) are disposed between the transport belts (18).

7. The isostatic press of claims 1 or 2 wherein the sliding head (5) is displaceable by a piston (23).

8. The isostatic press of claims 1 or 2 wherein the tool part (6) bearing the sliding head (5) is coupled with an upper ram of the press, and the mold parts (3) are disposed on a stationary bed (2) of the press.

9. The isostatic press of claim 4 wherein holding members (19) for receiving the compacts (20) are provided on the transport belts (18), the distance between the holding member (19) and the adjacent mold part (3) being half the distance (b) between adjacent mold parts (3) in the row of mold parts.

10. The isostatic press of claim 4 wherein feed pipes (8) extending from filling containers (7) to the molds (13) are disposed between the transport belts (18).

11. The isostatic press of claim 3 wherein the sliding head (5) is displaceable by a piston (23).

12. The isostatic press of claim 3 wherein the tool part (6) bearing the sliding head (5) is coupled with an upper ram of the press, and the mold parts (3) are disposed on a stationary bed (2) of the press.

* * * * *

UNITED STATES PATENT AND TRADEMARK OFFICE

CERTIFICATE OF CORRECTION

PATENT NO. : 5,080,573

DATED : January 14, 1992

INVENTOR(S) : Hubert Schaidl et al.

It is certified that error appears in the above-identified patent and that said Letters Patent is hereby corrected as shown below:

Title page, item [75], delete "both" and insert the following --Walter Rau, Benediktbeuern; Friedel Maurer, Kochel, all--.

Item [57] ABSTRACT, delete "cermaic" on line 2 and substitute therefor --ceramic--.

At Column 1, line 28, delete "while" and substitute therefor --which--.

At Column 1, line 51, delete "sheats" and substitute therefor --sheaths--.

Signed and Sealed this

Twentieth Day of April, 1993

*Attest:*

MICHAEL K. KIRK

*Attesting Officer* *Acting Commissioner of Patents and Trademarks*